United States Patent
You

(10) Patent No.: US 10,213,045 B2
(45) Date of Patent: Feb. 26, 2019

(54) COOKING VESSEL

(71) Applicant: Byung Youl You, Gyeonggi-do (KR)

(72) Inventor: Byung Youl You, Gyeonggi-do (KR)

( * ) Notice: Subject to any disclaimer, the term of this patent is extended or adjusted under 35 U.S.C. 154(b) by 0 days.

(21) Appl. No.: 15/308,588

(22) PCT Filed: May 7, 2015

(86) PCT No.: PCT/KR2015/004556
§ 371 (c)(1),
(2) Date: May 22, 2017

(87) PCT Pub. No.: WO2016/047883
PCT Pub. Date: Mar. 31, 2016

(65) Prior Publication Data
US 2017/0258258 A1    Sep. 14, 2017

(30) Foreign Application Priority Data
Sep. 23, 2014    (KR) .................. 20-2014-0006909 U

(51) Int. Cl.
*A47J 27/022*    (2006.01)
*A47J 36/02*    (2006.01)
*A47J 45/06*    (2006.01)

(52) U.S. Cl.
CPC ............. *A47J 27/022* (2013.01); *A47J 36/02* (2013.01); *A47J 45/061* (2013.01)

(58) Field of Classification Search
CPC ........ A47J 27/022; A47J 36/02; A47J 45/061; A47J 27/002
See application file for complete search history.

(56) References Cited

U.S. PATENT DOCUMENTS

| | | | | |
|---|---|---|---|---|
| 1,460,380 A | * | 7/1923 | Hughes | A47J 37/10 126/376.1 |
| 2,172,952 A | * | 9/1939 | Benesh | A47J 36/00 126/376.1 |
| 2007/0193575 A1 | * | 8/2007 | Jan | A47J 27/02 126/390.1 |

FOREIGN PATENT DOCUMENTS

| | | |
|---|---|---|
| JP | H08177168 | 7/1996 |
| JP | 201094002 | 9/2010 |
| KR | 2019980006535 | 4/1998 |
| KR | 2020000005278 | 3/2000 |
| KR | 20110044010 | 4/2011 |

* cited by examiner

*Primary Examiner* — Andrew T Kirsch
(74) *Attorney, Agent, or Firm* — IPLA P.A.; James E. Bame

(57) ABSTRACT

Provided is a cooking vessel which comprises heat transfer structures for directing a flame, which is concentrated on the center of a vessel part, to be diffused to the edge of the vessel part, thus allows heat to be sufficiently diffused to parts other than the center while the heat is conducted from the outer side to the inner side of the bottom of the vessel part, can be made lightweight, and allows a reduction in material and production costs. The cooking vessel, which comprises the vessel part in which to put and cook contents and handle parts installed on the vessel part, has the heat transfer structures installed on the outer side of the bottom of the vessel part, wherein the heat transfer structures are formed in a shape that allows the radial formation of multiple flame diffusion paths for flame diffusion to the edge of the vessel part.

2 Claims, 4 Drawing Sheets

COOKING VESSEL

BACKGROUND

The present invention relates to a cooking vessel, and more particularly, to a cooking vessel which includes a heat transfer structure to increase a heat transfer area and enhance energy efficiency by improving a flow of flames, thereby reducing cooking time.

In general, cooking vessels, such as rice cookers, pots, meat roasters, frying pans and so on, which are widely used at home or restaurants are made of nonferrous metals, such as stainless steel or aluminum, or ceramics requiring thermal resistance and durability, and have different shapes according to use purposes but commonly include a vessel part for accommodating and cooking food ingredients and a handle part mounted on the vessel part.

Such cooking vessels are divided into vessels used for a gas range and vessels used for an induction range. In case of the cooking vessels for the gas range, because the vessel part directly comes into contact with flames of the gas range, cooking vessels made of aluminum or stainless steel with thermal resistance and thermal conductivity are used.

In the meantime, the cooking vessel for the gas range is used on the gas range, and flames intensively apply heat to the center of the vessel part of the cooking vessel during the cooking process under the condition that the cooking vessel is put on the gas range. Therefore, because the center of the vessel part of the cooking vessel gets higher in heating temperature than other portions of the vessel part, the food ingredients are locally burned.

In order to prevent such a phenomenon, the bottom of the vessel part is manufactured to have a predetermined thickness or more so that heat is sufficiently diffused not only to the center but also to other portions while heat is being transferred from the outer side to the inner side of the vessel part.

However, such cooking vessels have several disadvantages in that the total weight of the cooking vessel is increased and it is not easy for users to handle because the bottom of the vessel part is formed thick and in that heat transfer efficiency is deteriorated due to a small heat transfer area formed at the bottom of the vessel part and manufacturing expenses and costs are increased due to unnecessary waste of raw materials.

Patent Reference 1: Korean Patent Laid-open No. 10-2011-0044010.

SUMMARY OF THE INVENTION

Accordingly, the present invention has been made in an effort to solve the above-mentioned problems occurring in the prior arts, and it is an object of the present invention to provide a cooking vessel, which includes a heat transfer structure for increasing a heat transfer area of the bottom of a vessel part in order to rapidly heat the cooking vessel with less energy and for inducing flames concentrated on the center of the vessel part to be diffused to the edge of the vessel part, thereby sufficiently diffusing heat not only to the center but also to the other portions of the vessel part while heat is transferred from the outer side to the inner side of the bottom of the vessel part, being made lightweight and reducing material and manufacturing costs.

To achieve the above objects, the present invention provides a cooking vessel which includes a vessel part for accommodating and cooking food ingredients and a handle part mounted on the vessel part, wherein the cooking vessel includes a heat transfer structure which is mounted on the outer face of the bottom of the vessel part and includes a plurality of flame diffusion passages radially formed to diffuse flames from the center of the vessel part to the edge of the vessel part.

Preferably, the heat transfer structure includes first flame diffusion inducing blocks which are formed to extend from the outer rim of a predetermined area of the center of the bottom of the vessel part, where flames are directly transferred to the bottom of the vessel part, to the outer rim of the edge of the bottom of the vessel part and which are radially mounted on the bottom of the vessel part.

Preferably, the heat transfer structure further includes second flame diffusion inducing blocks which are formed to extend from the edge of the bottom of the vessel part to the center of the bottom of the vessel part, are mounted between the first flame diffusion inducing blocks, and are shorter than the first flame diffusion inducing blocks.

Preferably, the heat transfer structure further includes third flame diffusion inducing blocks which are formed to extend from a point, which is spaced apart from the outer rim of a predetermined area where the flames are directly transferred to the bottom of the vessel part, to a point, which is spaced apart from the outer rim of the edge of the bottom of the vessel part at a predetermined distance, and are mounted between the first flame diffusion inducing blocks.

Preferably, the heat transfer structure further includes fourth flame diffusion inducing blocks which are formed to extend from the edge of the bottom of the vessel part to the center of the bottom of the vessel part, are mounted in pairs between the first flame diffusion inducing blocks, and are spaced apart from each other in such a way that the third flame diffusion inducing block is interposed between the fourth flame diffusion inducing blocks.

As described above, due to the heat transfer structure for increasing the heat transfer area of the bottom of the vessel part in order to rapidly heat the cooking vessel with less energy and for inducing flames concentrated on the center of the vessel part to be diffused to the edge of the vessel part, the cooking vessel according to the present invention can sufficiently diffuse heat not only to the center but also to the other portions of the vessel part while heat is transferred from the outer side to the inner side of the bottom of the vessel part, is made lightweight and can reduce material and manufacturing costs.

DETAILED DESCRIPTION OF THE INVENTION

Hereinafter, reference will be now made in detail to the preferred embodiment of the present invention with reference to the attached drawings.

Figure 1:
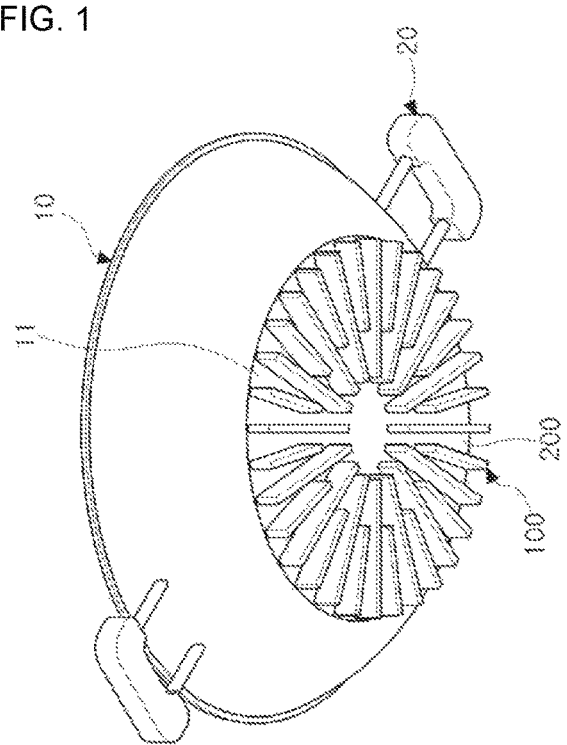
FIG. 1 is a view showing a cooking vessel according to a preferred embodiment of the present invention.
Figure 2:
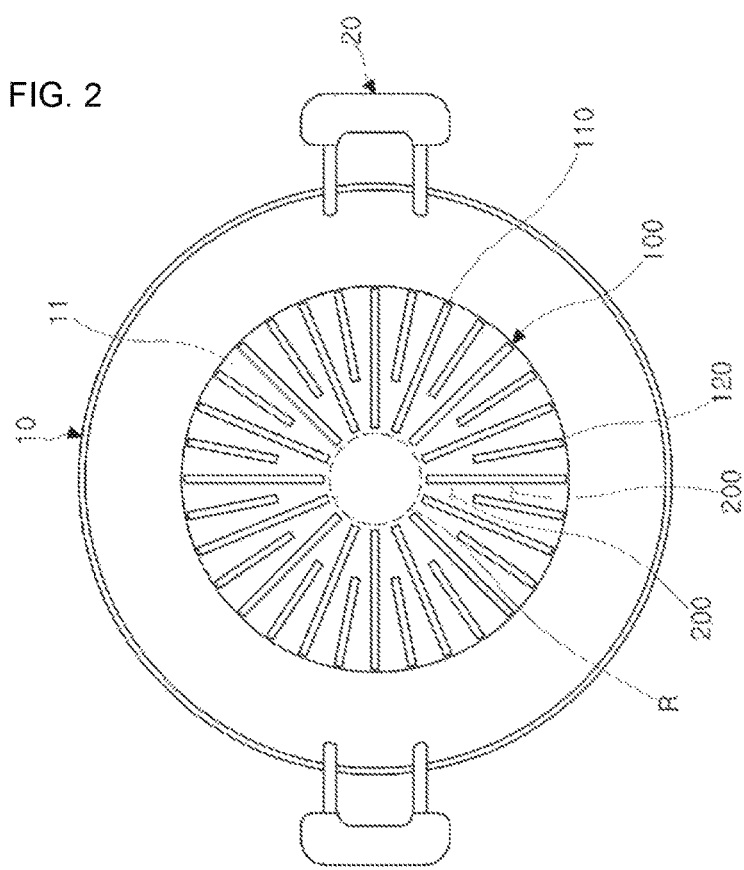
FIG. 2 is a view showing a heat transfer structure of the cooking vessel according to a first preferred embodiment of the present invention.
Figure 3:
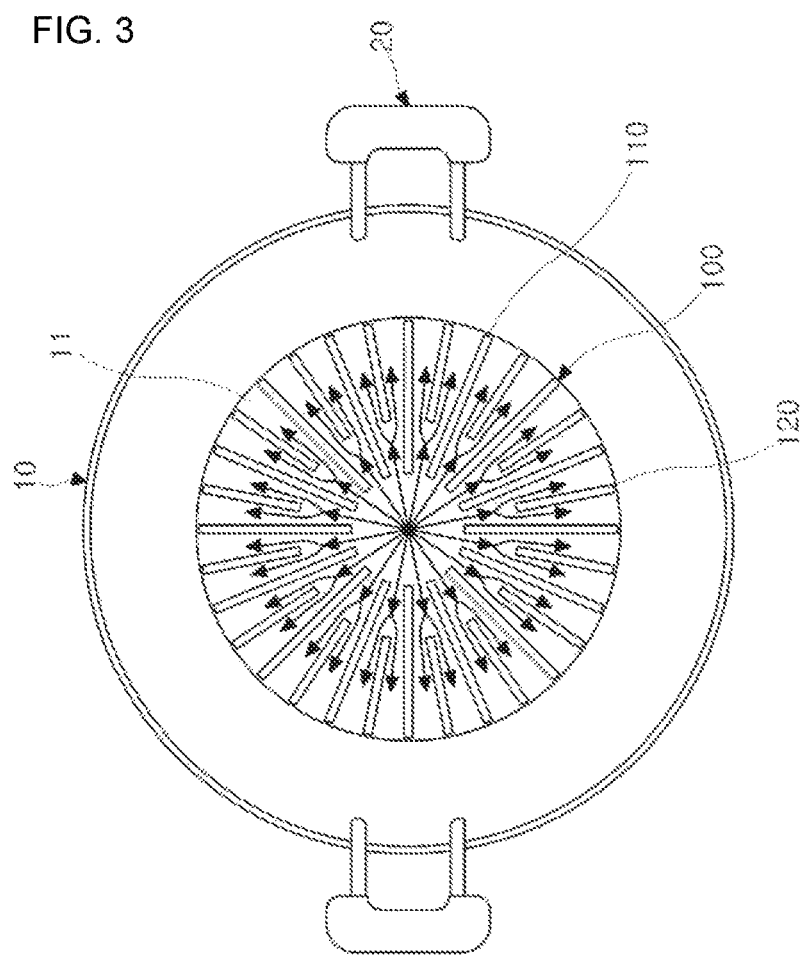
FIG. 3 is a view showing a state where flames are diffused to the edge of a vessel part from the center of the vessel part of the heat transfer structure of the cooking vessel according to the first preferred embodiment of the present invention.
Figure 4:
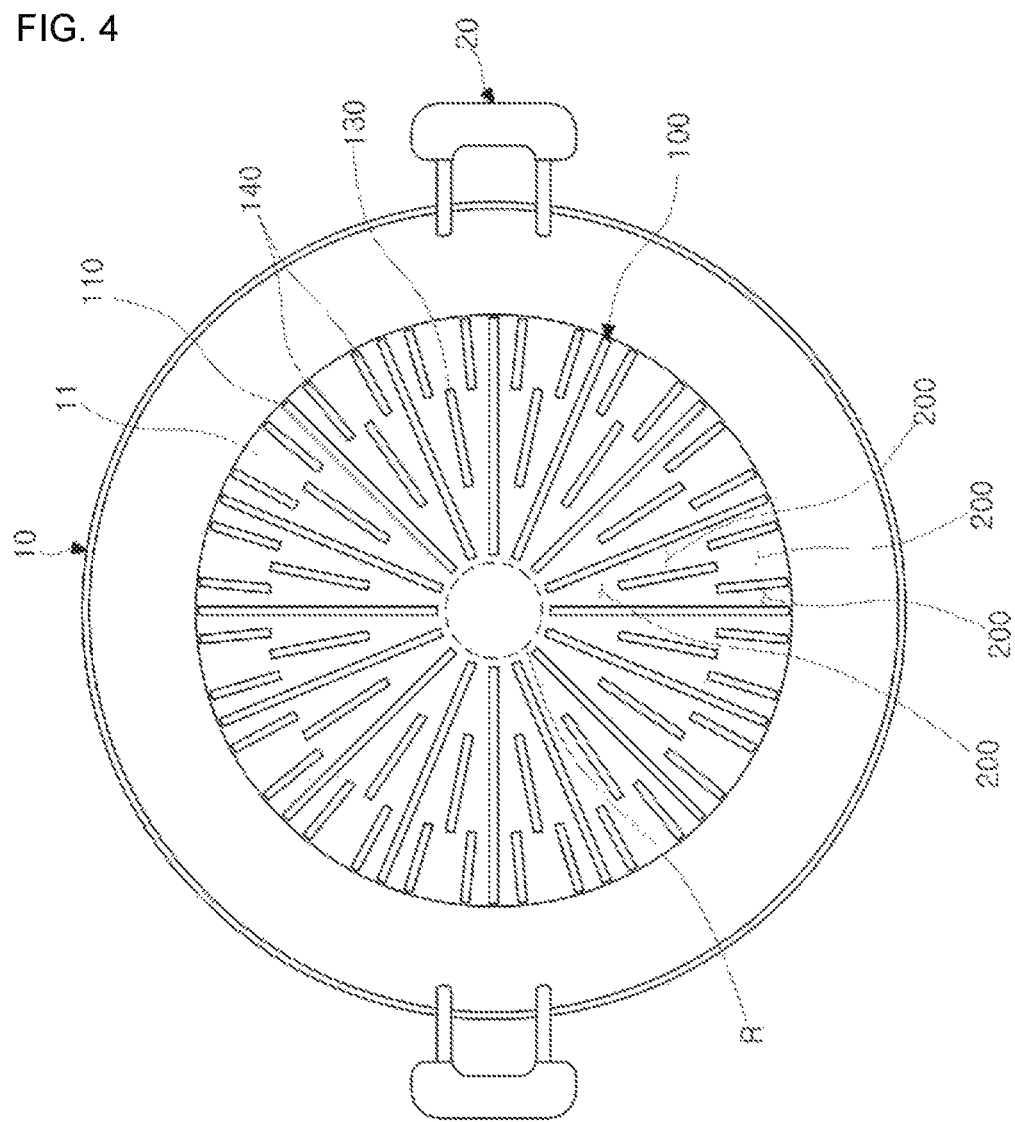
FIG. 4 is a view showing a heat transfer structure of the cooking vessel according to a second preferred embodiment of the present invention.
Figure 5:
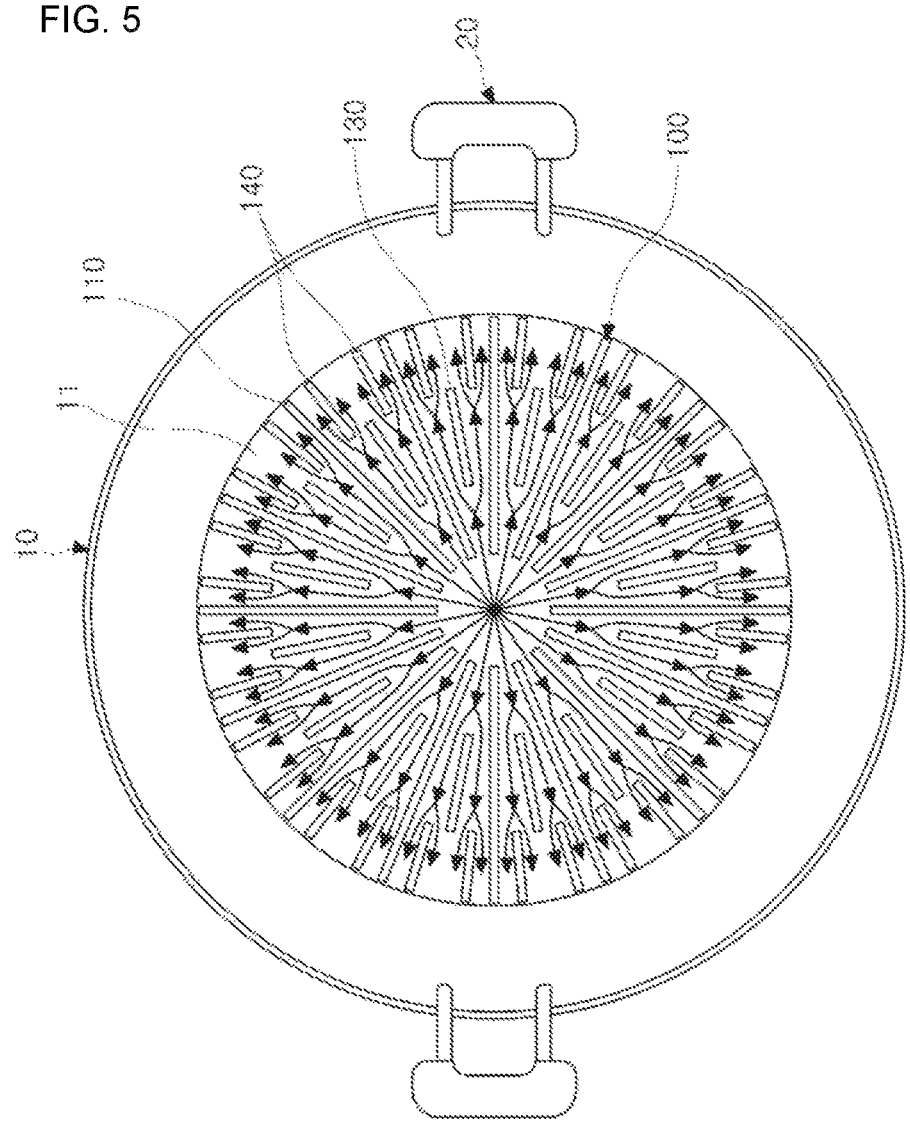
FIG. 5 is a view showing a state where flames are diffused to the edge of the vessel part from the center of the vessel part of the heat transfer structure of the cooking vessel according to the second preferred embodiment of the present invention.

FIG. 1 is a view showing a cooking vessel according to a preferred embodiment of the present invention, FIG. 2 is a view showing a heat transfer structure of the cooking vessel according to a first preferred embodiment of the present invention, FIG. 3 is a view showing a state where flames are diffused to the edge of a vessel part from the center of the vessel part of the heat transfer structure of the cooking vessel according to the first preferred embodiment of the present invention, FIG. 4 is a view showing a heat transfer structure of the cooking vessel according to a second preferred embodiment of the present invention, and FIG. 5 is a view showing a state where flames are diffused to the edge of the vessel part from the center of the vessel part of the heat transfer structure of the cooking vessel according to the second preferred embodiment of the present invention.

Referring to FIGS. 1 to 3, the cooking vessel according to the preferred embodiment of the present invention is a sort of cooking vessels, such as rice cookers, pots, meat roasters, frying pans and so on, which are widely used at home or restaurants, and includes a vessel part 10 for accommodating and cooking food ingredients and a handle part 20 mounted on the vessel part.

In the meantime, besides the above components, the cooking vessel according to the present invention further includes a heat transfer structure 100 for inducing flames intensively applied to the center of the vessel part 10 to be diffused to the edge of the vessel part 10.

The heat transfer structure 100 is mounted on the outer face of the bottom 11 of the vessel part 10 and includes a plurality of flame diffusion passages 200 radially formed to diffuse the flames from the center of the vessel part 10 to the edge of the vessel part 10.

FIGS. 1 to 3 illustrate the first preferred embodiment of the heat transfer structure 100. In the first preferred embodiment, preferably, the heat transfer structure 100 is applied to the vessel part 10 having the bottom 11, which is less than 150 mm in diameter.

As shown in FIGS. 1 and 2, the heat transfer structure 100 includes first flame diffusion inducing blocks 110 which are formed to extend from the outer rim of a predetermined area (R), where flames are directly transferred to the bottom of the vessel part, to the outer rim of the edge of the bottom 11 of the vessel part 10 and which are radially mounted on the bottom 11 of the vessel part 10.

In FIGS. 1 and 2, the heat transfer structure 100 further includes second flame diffusion inducing blocks 120, but can sufficiently induce diffusion of the flames just by the first flame diffusion inducing blocks 110.

The first flame diffusion inducing blocks 110 are in the form of a rectangular plate, and it is preferable that a protrusion length of the first flame diffusion inducing block 110 be about 8 mm to 12 mm, the second flame diffusion inducing blocks 120, third flame diffusion inducing blocks 130 and fourth flame diffusion inducing blocks 140 also have the same protrusion length. It is to deduce the optimum length to optimally diffuse the flames in consideration of the height of the flames of the gas range.

Meanwhile, as shown in FIGS. 1 and 2, the heat transfer structure 100 may further include the second flame diffusion inducing blocks 120 in order to increase the flame diffusion effect.

The second flame diffusion inducing blocks 120 are in the form of a rectangular plate, are formed to extend from the edge of the bottom 11 of the vessel part 10 to the center of the bottom 11 of the vessel part 10, are mounted between the first flame diffusion inducing blocks 110, and are shorter than the first flame diffusion inducing blocks 110.

In the first preferred embodiment, the heat transfer structure 100 includes a plurality of flame diffusion paths 200 for diffusing the flames from the center of the vessel part 10 to the edge of the vessel part 10 so as to induce the flames to move to the edge of the bottom 11 of the vessel part 10 along the flame diffusion paths 200 as indicated by the arrows of FIG. 3 while heat is conducted from the outer side of the bottom 11 to the inner side. In this instance, the second flame diffusion inducing block 120 induces the flames moving along the flame diffusion path 200 between the first flame diffusion inducing blocks 110 to progress in two directions, so that the flames can be diffused in a wider range.

Hereinafter, referring to FIGS. 4 and 5, and partially referring to FIG. 1, a heat transfer structure according to the second preferred embodiment, which is applied to the cooking vessel according to the present invention, will be described.

In the second preferred embodiment, preferably, the heat transfer structure 100 will be applied to the case that the bottom 11 of the vessel part 10 of the cooking vessel is more than 200 mm in diameter.

As shown in FIGS. 4 and 5, the heat transfer structure 100 according to the second preferred embodiment includes first flame diffusion inducing blocks 110 which are formed to extend from the outer rim of a predetermined area (R), where flames are directly transferred to the bottom of the vessel part, to the outer rim of the edge of the bottom 11 of the vessel part 10 and which are radially mounted on the bottom 11 of the vessel part 10, like the first preferred embodiment.

In the meantime, the heat transfer structure 100 according to the second preferred embodiment further includes third flame diffusion inducing blocks 130 and fourth flame diffusion inducing blocks 140.

The third flame diffusion inducing blocks 130 are in the form of a rectangular plate, are formed to extend from a point, which is spaced apart from the outer rim of a predetermined area (R) where the flames are directly transferred to the bottom 11 of the vessel part 10, to a point, which is inwardly spaced apart from the outer rim of the edge of the bottom 11 of the vessel part 10 at a predetermined distance, and are mounted between the first flame diffusion inducing blocks 110.

The fourth flame diffusion inducing blocks 140 are in the form of a rectangular plate, are formed to extend from the edge of the bottom 11 of the vessel part 10 to the center of the bottom 11 of the vessel part 10, are mounted in pairs between the first flame diffusion inducing blocks 110, and are spaced apart from each other in such a way that the third flame diffusion inducing block 130 is interposed between a pair of the fourth flame diffusion inducing blocks 140.

In the second preferred embodiment, the heat transfer structure 100 includes a plurality of flame diffusion paths 200 for diffusing the flames from the center of the vessel part 10 to the edge so as to induce the flames to move to the edge of the bottom 11 of the vessel part 10 along the flame diffusion paths 200 as indicated by the arrows of FIG. 4 while heat is conducted from the outer side of the bottom 11 to the inner side. In this instance, the third flame diffusion inducing block 120 induces the flames moving along the flame diffusion path 200 between the first flame diffusion inducing blocks 110 to progress in two directions, so that the flames can be diffused in a wider range. Furthermore, the fourth flame diffusion inducing block 140 induces the flames moving along the flame diffusion path 200 between the first flame diffusion inducing block 110 and the third flame diffusion inducing block 130 to progress in two directions again, so that the flames can be diffused in a still wider range.

As described above, due to the heat transfer structure for inducing flames concentrated on the center of the vessel part to be diffused to the edge of the vessel part, the cooking vessel according to the present invention can sufficiently diffuse heat not only to the center but also to the other portions of the vessel part while heat is transferred from the outer side to the inner side of the bottom of the vessel part, is made lightweight and can reduce material and manufacturing costs.

While the present invention has been particularly shown and described with reference to exemplary embodiments thereof, it will be understood by those of ordinary skill in the art that various changes and modifications in form and details may be made therein without departing from the spirit and scope of the present invention as defined by the following claims.

The invention claimed is:

1. A cooking vessel which includes a vessel part (10) for accommodating and cooking food ingredients and a handle part (20) mounted on the vessel part (10), the cooking vessel comprising:
 a heat transfer structure (100) which is mounted on an outer face of the bottom of the vessel part (10) and includes a plurality of flame diffusion passages (200) radially formed to diffuse flames from a center of the vessel part (10) to an edge of the vessel part (10),
 wherein the heat transfer structure (100) comprises:
 first flame diffusion inducing blocks (110) which are formed to extend from the outer rim of a predetermined area (R) of the center of the bottom of the vessel part (10), where flames are directly transferred to the bottom of the vessel part, to the outer rim of the edge of the bottom of the vessel part (10) and which are radially mounted on the bottom of the vessel part (10), so as to form one of the plurality of flame diffusion passages (200) between two neighboring first flame diffusion inducing blocks (110); and
 third flame diffusion inducing blocks (130) which are formed to extend from a point, which is spaced apart from an outer rim of the predetermined area (R) where the flames are directly transferred to the bottom of the vessel part (10), to a point, which is spaced apart from the outer rim of the edge of the bottom of the vessel part (10) at a predetermined distance, and are mounted alternately between two neighboring first flame diffusion inducing blocks (110), so as to form two of the plurality of flame diffusion passages (200) between each of the first flame diffusion inducing blocks (110) and two neighboring third flame diffusion inducing blocks (130),
 wherein a first even branching of each of the flame diffusion passages is obtained between the two first flame diffusion inducing blocks (110), and
 wherein a second even branching of each of the two flame diffusion passages at the first even branching is obtained on both sides of one of the neighboring third flame diffusion inducing blocks (130).

2. The cooking vessel according to claim 1, wherein the heat transfer structure (100) further comprises:
 fourth flame diffusion inducing blocks (140) which are formed to extend from the edge of the bottom of the vessel part (10) to the center of the bottom of the vessel part (10), are mounted in pairs between the first flame diffusion inducing blocks (110), and are spaced apart from each other in such a way that the third flame diffusion inducing block (130) is interposed between the fourth flame diffusion inducing blocks (140), so as to divide each of the flame diffusion passages (200) formed between one of the first flame diffusion inducing blocks (110) and a neighboring third flame diffusion inducing block (130) into two,
 wherein a third even branching of each of the two flame diffusion passages at the third even branching is obtained on both sides of one of the neighboring fourth flame diffusion inducing blocks (140).

* * * * *